A. K. HORTON.
HARROW.
APPLICATION FILED JULY 26, 1912.
1,059,672. Patented Apr. 22, 1913.
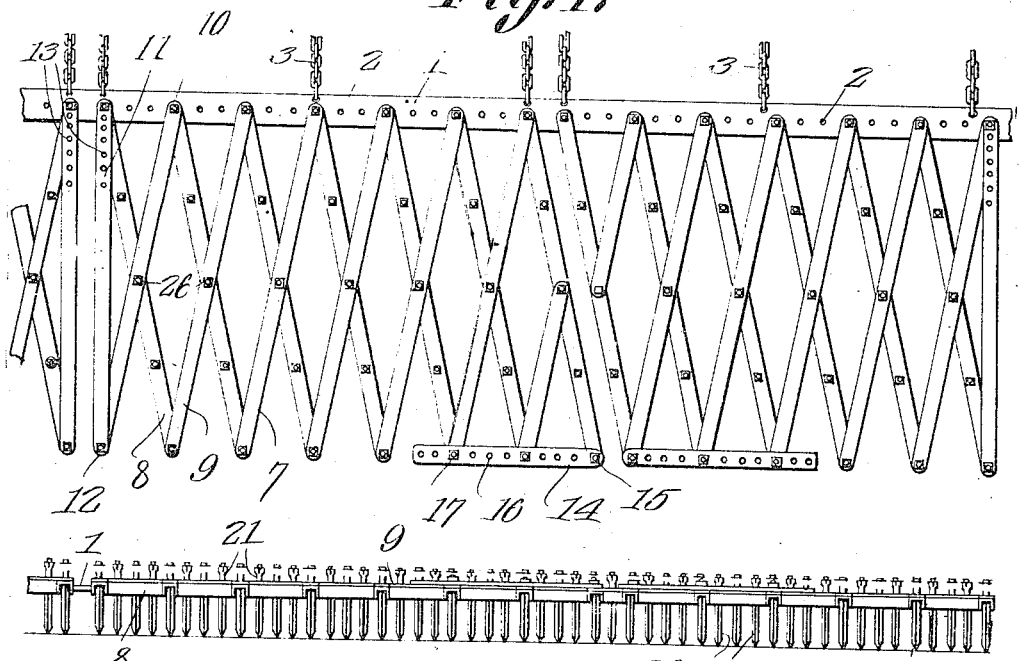
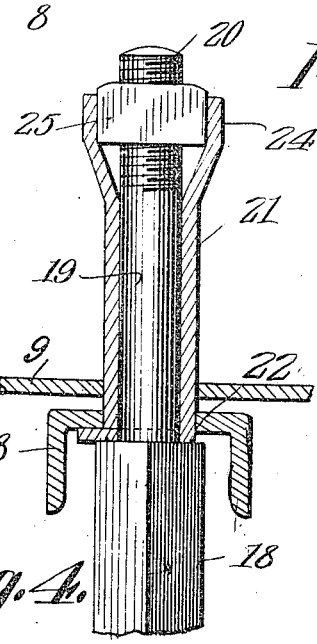
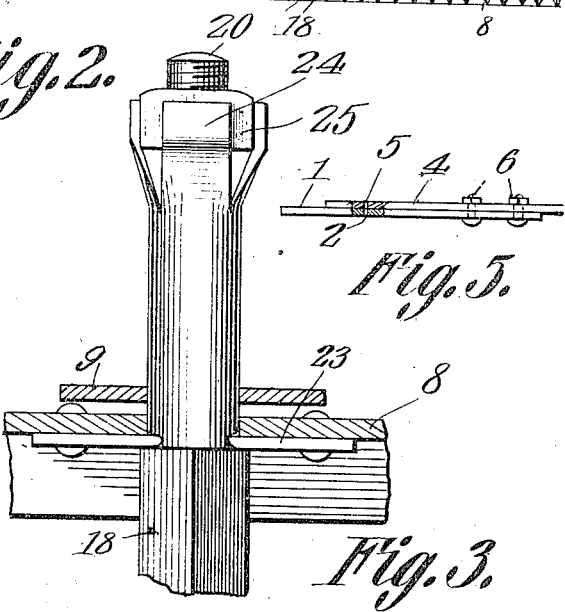
Alfred K. Horton, Inventor

UNITED STATES PATENT OFFICE.

ALFRED K. HORTON, OF WICHITA, KANSAS.

HARROW.

1,059,672.  Specification of Letters Patent.  Patented Apr. 22, 1913.

Application filed July 26, 1912.  Serial No. 711,707.

*To all whom it may concern:*

Be it known that I, ALFRED K. HORTON, a citizen of the United States, residing at Wichita, in the county of Sedgwick and State of Kansas, have invented a new and useful Harrow, of which the following is a specification.

This invention relates to harrows, one of its objects being to provide a simple and compact structure of this character which can be readily extended to any desired width, means being employed for holding the harrow securely in extended position.

Another object is to provide a harrow made up of sections designed to move independently of each other.

Another object is to provide novel means for attaching harrow teeth to the harrow structure, said means being so constructed as to prevent the teeth from becoming accidentally detached.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a harrow having the present improvements. Fig. 2 is an end elevation thereof. Fig. 3 is a view partly in elevation and partly in section, showing the means employed for connecting a tooth to the harrow. Fig. 4 is a longitudinal section through said connection. Fig. 5 is a rear elevation of one end portion of the draw bar.

Referring to the figures by characters of reference 1 designates a draw bar of any desired length and provided, at regular intervals, with apertures 2, these apertures being arranged in alinement. Any suitable number of draft chains 3 or the like extend from the draw bar. One or both ends of the draw bar may be provided with an extension 4 which bears downwardly thereon and has a series of openings 5 therein adapted to register with certain of the openings in the draw bar 1. This extension 4 may be secured to the draw bar 1 by means of bolts 6 or in any other suitable manner. Thus it will be seen that, by adjusting the extension or extensions upon the draw bar, the said bar can be made of a length equal to the width of the harrow to be used.

Connected to the draw bar 1 and its extensions are harrow sections each of which consists of a lazy tongs 7, the lower members of these tongs being preferably formed of channeled strips, as shown at 8 while the upper members of the tongs are preferably made up of flat strips, as shown at 9. The front ends of the members of the lazy tongs are pivotally and adjustably connected to the draw bar 1 by pivot devices 10 and it will be apparent that, by removing these devices, the lazy tongs can be extended or contracted until the harrow is of any desired width whereupon the bolts can be reinserted into those of the openings 2 and 5 registering therewith. The harrow sections are arranged side by side and are duplicates of each other. Each of the sections has a lock bar 11 at one end one end of the bar being pivotally connected as at 12 to one of the members 9 of the lazy tongs while the other end portion of the bar has a longitudinal series of apertures 13 any one of which is adapted to receive the pivot device 10. The extreme member at the other side of each section of the harrow has another lock bar 14 connected thereto by a pivot device 15 and provided with a longitudinal series of openings 16 adapted to receive pivot devices 17 which connect the adjacent pairs of members 8 and 9 as shown in Fig. 1. It will be apparent that when these lock bars 11 and 14 are secured to the members of the lazy tongs, it becomes impossible for the tongs to become distorted while in use.

Each of the pivot devices herein referred to includes a harrow tooth 18 having a cylindrical stem 19 screw threaded at its upper end as shown at 20. This stem 19 is adapted to project through a tubular post 21 which extends through the openings 22 in the harrow strips or members and has oppositely extending ears 23 riveted or otherwise secured to the channeled member as shown in Fig. 3. The upper end of the post 21 is split longitudinally to form spaced wings 24. When the stem 19 of the harrow tooth is extended into the post 21, a nut, such as shown at 25 may be screwed onto the stem so as to draw the same longitudinally within the post. The tongues or wings 24 can then be fed against the nut so as to hold it against rotation. Thus, it will be seen, that the harrow tooth is securely held to the harrow.

It is to be understood that the harrow teeth may be placed at any points desired along the members 8 and 9 but, as shown in the drawings, each of the members 8 is preferably provided with two teeth in addition to those located at the joints, one being located at each side of the center pivot 26 of the member. Where the teeth are located at the joints, the tubular posts constitute wear devices for protecting the stems 19.

What is claimed is:—

1. A harrow including a draw bar, a lazy tong adjustably connected thereto, a tubular post upstanding from one of the members of the lazy tongs, said post having bendable tongues at its upper end, a harrow tooth including a threaded stem projecting through the post, and a nut engaging the stem and held against rotation by said tongues.

2. A harrow including an extensible draw bar having a series of alining apertures, harrow sections adjustably connected to the draw bar and each consisting of a lazy tong and lock bars adjustably connecting opposed portions of the lazy tongs, and means constituting pivotal connections between the members of the lazy tongs and between the lock bars and said members, each of said means including a tubular post extending through the members, each post having bendable tongues at its upper end, a harrow tooth including a threaded stem projecting through the post, and a nut engaging the stem and held against rotation by the tongues.

3. In a harrow, crossed tooth carrying members, a tubular post upstanding from one of the members and constituting the pivot of the other member, said post having bendable tongues at its upper end, a harrow tooth having a threaded stem projecting through the post, and means engaging the stem and held against rotation by the tongues for fastening the tooth to the post.

In testimony that I claim the foregoing as my own, I have hereto affixed my signature in the presence of two witnesses.

ALFRED K. HORTON.

Witnesses:
C. A. L. Lewis.
H. D. Siner.